United States Patent Office 3,254,073
Patented May 31, 1966

3,254,073
DISAZO DYES FOR HYDROPHOBIC FIBERS
David J. Wallace and Max A. Weaver, Kingsport, Tenn., assignors to Eastman Kodak Company, Rochester, N.Y., a corporation of New Jersey
No Drawing. Filed May 1, 1963, Ser. No. 277,120
6 Claims. (Cl. 260—187)

This invention relates to disazo compounds especially useful as dyes for coloring textile materials.

The disazo compounds of the invention have the following general formula (I)
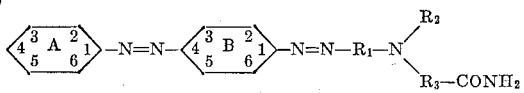

wherein the benzene ring A may carry substituents such as hydrogen, lower alkyl, e.g., 4-methyl, 3-methyl, 2,5-dimethyl; lower alkoxy, e.g., 4-methoxy; 4-nitro, lower alkanolamino, e.g., 4-N($C_2H_4$OH)$_2$, aliphatic acylamino, e.g., 4-acetamido; halogen, e.g., 4-chloro, 4-bromo; hydroxy, e.g., 4-hydroxy, etc., and the benzene ring B may carry substituents such as lower alkyl, e.g., 2,5-dimethyl, 3-methyl, lower alkoxy, e.g., 3-methoxy, $R_1$ represents a monocyclic arylene group of the benzene series, i.e., phenylene and substituted phenylene, such as halophenylene, e.g., m-Cl-phenylene

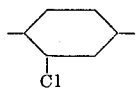

in which the chlorine atom is in the position meta to the nitrogen atom to which both $R_2$ and $R_3$ are attached, lower alkoxyphenylene, e.g., m-(OCH$_3$)phenylene

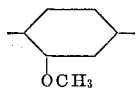

lower alkylphenylene, e.g., m-tolylene

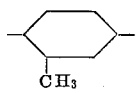

o-tolylene

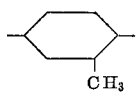

or in the radical

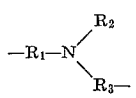

$R_1$ together with $R_2$ and the nitrogen atom form the 6-tetrahydroquinolyl radical or a substituted 6-tetrahydroquinolyl radical such as

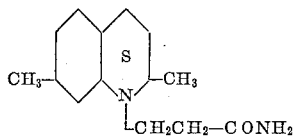

present in the compound of Example 8 below and the 2,2,4,7-tetramethyl-6-tetrahydroquinolyl radical.

$R_2$=H, alkyl, e.g., lower alkyl, lower hydroxyalkyl and lower cyanoalkyl groups such as methyl, hydroxyethyl and cyanoethyl, $R_3$=lower alkylene, e.g., methylene, ethylene, propylene, butylene.

Herein, "lower alkyl," "lower alkoxy" groups, etc., mean the group contains a straight or branched chain alkyl group of 1 to 4 carbon atoms.

The novel disazo compounds can be obtained in known manner by diazotizing aminoazo compounds having the formula (II)
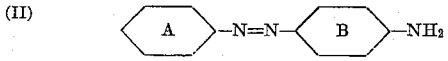

and coupling with N-carboxamidoalkyl aniline couplers having the formula (III)
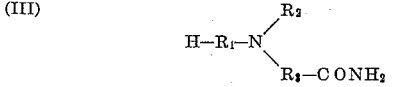

in which rings A, B and radicals $R_1$, $R_2$ and $R_3$ are as described above. The preparation of couplers of Formula III is described in our copending U.S. patent application Serial No. 277,117 filed May 1, 1963.

Representative N-carboxamidoalkylaniline compounds of Formula III useful in preparing the azo compounds of the invention areas follows:

N-β-carboxamidoethyl-N-ethyl-m-toluidine
N-β-carboxamidoethyl-N-ethyl-m-chlooroaniline
N-β-carboxamidoethyl-N-ethyl-m-anisidine
N-β-carboxamidomethyl-N-ethylaniline
N-β-carboxamidoethyl-o-toluidine
N-β-carboxamidoethyl-2-methyl-1,2,3,4-tetrahydroquinoline
N-β-carboxamidoethyl-1,2,3,4-tetrahydroquinoline
N-β-carboxamidoethyl-2-methyl-1,2,3,4-tetrahydroquinoline
N-β-carboxamidoethyl-2,7-dimethyl-1,2,3,4-tetrahydroquinoline
N-β-carboxamidoethyl-2,4,7-trimethyl-1,2,3,4-tetrahydroquinoline
N-β-carboxamidoethyl-2-2,4,7-tetramethyl-1,2,3,4-tetrahydroquinoline
N-β-carboxamidobutyl-N-ethylaniline
N-β-carboxamidoethyl-N-β-hydroxyethyl-m-toluidine
N-β-carboxamidoethyl-N-β-hydroxyethylaniline
N-β-carboxamidoethyl-N-β-cyanoethyl-m-toluidine
N-β-carboxamidoethyl-N-butyl-m-toluidine The disazo compounds can be used for dyeing textile materials including synthetic polymer fibers, yarns and fabrics giving fast shades when applied by conventional dyeing methods to cellulose ester and polyester fibers. The disazo compounds have moderate affinity for polyamide fibers and possess the valuable property of staining wool less than do many other related dyes. When the disazo compounds are used for dyeing such hydrophobic materials, they should be free of water-solubilizing groups such as sulfo and carboxyl groups. In general the dyes have good fastness, for example, to light, washing, gas (atmospheric fumes) and sublimation. The dyes are useful in application and discharge printing.

The following examples will serve to illustrate the preparation of representative disazo compounds of the invention.

Example 1.—A solution of nitrosyl sulfuric acid was prepared by careful addition of 0.9 g. NaNO$_2$ to 6.25 ml. conc. H$_2$SO$_4$. This solution was cooled to about 3° C. and 15 ml. 1:5 acid (1 part propionic: 5 parts acetic) was added below 15° C. Then, at below 10° C., 2.39 g. 4-amino-2,5,4'-trimethylazobenzene was added, followed by 15 ml. 1:5 acid. The reaction was stirred 2 hours at 0–5° C., then added to a solution of 2.06 g. N-β-carboxamidoethyl-N-ethyl-m-toluidine in 25 ml. 1:5 acid at 5° C. Solid ammonium acetate was added until the solution turned Congo Red paper brown, coupled 2 hr., then drowned with water, filtered, and dried. The product dyed cellulose acetate, nylon, and polyester fibers in fast red shades of excellent fastness and has the formula

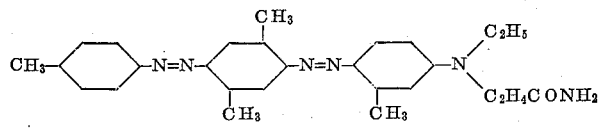

The examples in the following table are carried out in the manner of Example 1 using the appropriate azo compound of Formula II above and N-carboxamidoalkylaniline of Formula III. Rings A, B, and radicals $R_1$, $R_2$ and $R_3$ refer to Formulas II and III above. Thus the compound of Example 2 is prepared from the same diazotized azo compound as that of Example 1 and is coupled with N-carboxamidoethyl-N-ethylaniline. The color refers to dyeing cellulose acetate textile material.

manner described in U.S. Patents 2,880,050, 2,757,064, 2,782,187 and 3,043,827. The following example illustrates methods by which the disazo compounds of the invention can be used to dye textile materials.

0.1 gram of the dye is dissolved in the dye pot by warming in 5 cc. of ethylene glycol monomethyl ether. A 2% Igepon T and 0.5% sodium lignin sulfonate aqueous solution is added, with stirring, until a fine emulsion is obtained. Water is then slowly added to a total volume of 200 cc. 3 cc. of Dacronyx (a chlorinated benzene emulsion) are added and 10 grams of a textile fabric made of Kodel polyester fibers are entered. The fabric is worked 10 minutes without heat and then for 10 minutes at 80° C. The dyebath is then brought to the boil and held at the boil for one hour. Following this, the fabric is rinsed in warm water, then scoured in

| Example | Azo Compound (Formula II) | | N-Carboxamidoalkylaniline Coupler (Formula III) | | | Color |
|---|---|---|---|---|---|---|
| | Substituents on Ring A | Substituents on Ring B | $R^1$ | $R_2$ | $R_3$ | |
| 2 | 4-CH$_3$ | 2,5-di-CH$_3$ | Phenylene | C$_2$H$_5$ | —CH$_2$— | Orange. |
| 3 | 4-CH$_3$ | 2,5-di-CH$_3$ | m-Tolylene | C$_2$H$_5$ | —CH$_2$— | Red. |
| 4 | 4-CH$_3$ | 2,5-di-CH$_3$ | do | —C$_2$H$_4$CN | —CH$_2$CH$_2$— | Red. |
| 5 | 4-CH$_3$ | 2,5-di-CH$_3$ | do | —C$_2$H$_4$OH | —CH$_2$CH$_2$— | Red. |
| 6 | 4-CH$_3$ | 2,5-di-CH$_3$ | m-Cl-phenylene | —C$_2$H$_5$ | —CH$_2$CH$_2$— | Orange. |
| 7 | 4-CH$_3$ | 2,5-di-CH$_3$ | m-OCH$_3$phenylene | —C$_2$H$_5$ | —CH$_2$CH$_2$— | Pink. |
| 8 | 4-CH$_3$ | 2,5-di-CH$_3$ | 2,7-dimethyltetrahydroquinoline | Part of ring | —CH$_2$CH$_2$— | Do. |
| 9 | None | None | m-Tolylene | —C$_2$H$_5$ | —CH$_2$CH$_2$— | Orange. |
| 10 | 4-CH$_3$ | 3-CH$_3$ | do | —C$_2$H$_5$ | —CH$_2$CH$_2$— | Red. |
| 11 | 4-CH$_3$ | None | do | —C$_2$H$_5$ | —CH$_2$CH$_2$— | Red. |
| 12 | None | 2,5-di-CH$_3$ | do | —C$_2$H$_5$ | —CH$_2$CH$_2$— | Orange. |
| 13 | 3-CH$_3$ | 3-CH$_3$ | do | —C$_2$H$_5$ | —CH$_2$CH$_2$— | Do. |
| 14 | 2,5-di-CH$_3$ | 2,5-di-CH$_3$ | do | —C$_2$H$_5$ | —CH$_2$CH$_2$— | Red. |
| 15 | 4-OCH$_3$ | 2,5-di-CH$_3$ | do | —C$_2$H$_5$ | —CH$_2$CH$_2$— | Pink. |
| 16 | 4-NO$_2$ | None | Phenylene | —C$_2$H$_5$ | —CH$_2$CH$_2$— | Violet. |
| 17 | 4-NO$_2$ | do | m-Tolylene | —C$_2$H$_5$ | —CH$_2$CH$_2$— | Do. |
| 18 | 4-N(C$_2$H$_4$OH)$_2$ | do | do | —C$_2$H$_5$ | —CH$_2$CH$_2$— | Red. |
| 19 | 4-NHCOCH$_3$ | do | do | —C$_2$H$_5$ | —CH$_2$CH$_2$— | Red. |
| 20 | 3-CH$_3$ | 3-CH$_3$ | 2,7-dimethyltetrahydroquinoline | Part of ring | —CH$_2$CH$_2$— | Pink. |
| 21 | 2,5-di-CH$_3$ | 2,5-di-CH$_3$ | do | do | —CH$_2$CH$_2$— | Do. |
| 22 | 4-CH$_3$ | 3-CH$_3$ | Phenylene | C$_2$H$_5$ | —CH$_2$CH$_2$— | Orange. |

It will be apparent from the above description that a wide variety of substituents may be present on Rings A and B and on radicals $R_1$, $R_2$, $R_3$ of the disazo compounds. In particular, these Rings A and B and $R_1$ can contain benzene nuclei unsubstituted or substituted, by one of the following radicals:

alkyl, especially lower alkyl;
alkoxy, especially lower alkoxy and dialkoxy;
halogen, e.g., bromine and iodine;
carboalkoxy, e.g., —COOCH$_3$;
hydroxyalkyl, e.g., hydroxyethyl;
alkoxyalkyl, e.g., methoxyethyl;
phenoxyalkyl, e.g., phenoxyethyl;
alkylthio, e.g., ethylthio;
phenylalkylthio, e.g., benzylthio;
acetamido;
acyloxy, e.g., acetoxy;
carbamoyl, e.g., phenylcarbamoyl;
acetoxyalkyl, e.g., β-acetoxyethyl;
hydroxy;
nitro;
alkylsulfonamido, e.g., methylsulfonamido;
phenylalkoxy, e.g., benzyloxy;
hydroxyalkoxy, e.g., β-hydroxyethoxy;
haloalkoxy, e.g., β-chloroethoxy;
phenoxyalkoxy, e.g., β-phenoxyethoxy;
β(β′-phenoxyalkoxy)alkoxy, e.g., β(β′-phenoxyethoxy)ethoxy;
carboalkoxyalkyl, e.g., —(CH$_2$)$_2$COOCH$_3$;
acylaminoalkyl, e.g., acetylaminoethyl;
alkylcarbamoylalkyl, e.g., β-methylcarbamoylethyl;
cyanoalkyl, e.g., β-cyanoethyl;
cyanoalkylthio, e.g., cyanoethylthio.

The disazo compounds of the invention may be used for dyeing hydrophobic fibers such as linear polyester, cellulose ester, acrylic, polyamide, etc., fibers in the an aqueous 0.2% soap, 0.2% soda-ash solution. After scouring, the fabric is rinsed with water and dried. Accordingly, since the disazo compounds of the invention are water-insoluble, they can be applied from aqueous dispersions in the manner of the so-called "dispersed dyes." However, coloration can also be effected, for example, by incorporating the disazo compounds into the spinning dope and spinning the fiber as usual. The disazo compounds of our invention have varying utility as dyes. The degree of utility varies, for example, depending upon the material being dyed and the formula of the disazo compound. Thus, for example, all the dyes will not have the same degree of utility for the same material.

Cellulose esters which can be dyed with the disazo compounds include cellulose aliphatic carboxylic acid esters having 2 to 4 carbon atoms in the acid groups thereof, by which we mean to include, for example, both partially hydrolyzed and unhydrolyzed cellulose acetate, cellulose propionate and cellulose acetate-butyrate.

Polymeric linear polyester materials of the terephthalate type are illustrative of the linear aromatic polyester textile materials that can be dyed with the new disazo compounds of our invention. The terephthalate fibers sold under the trademarks "Kodel," "Dacron" and "Terylene," for example, in the form of filaments, yarn and fabric, for example, are illustrative of the polyester textile materials that can be dyed. Kodel polyester fibers are more particularly described in U.S. Patent 2,901,446. Dacron and Terylene polyester fibers are described, for example, in U.S. Patent 2,465,319. The polymeric linear polyester materials disclosed in U.S. Patent 2,945,010, 2,957,745 and 2,989,363, for example, can be dyed. The linear aromatic polyester materials specifically named have a melting point of at least 200° C.

Nylon, in fiber yarn and fabric form, is representative of polyamides which can be dyed with the disazo compounds.

The invention has been described in considerable detail with particular reference to certain preferred embodiments thereof, but it will be understood that variations and modifications can be effected within the spirit and scope of the invention as described hereinabove, and as defined in the appended claims.

What we claim is:

1. A disazo compound having the general formula

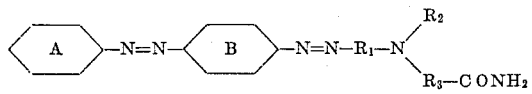

wherein
  Ring A=a benzene ring carrying a substituent of the class consisting of hydrogen, lower alkyl, lower alkanolamino, lower alkoxy, lower aliphatic carboxylic acid acylamido, chlorine and bromine,
  Ring B=a benzene ring carrying a substituent of the class consisting of hydrogen, lower alkoxy and lower alkyl,
  $R_1$=phenylene, lower alkyl phenylene, chlorophenylene or lower alkoxyphenylene,
  $R_2$=a member of the class consisting of lower alkyl, lower hydroxyalkyl and lower cyanoalkyl,
  $R_3$=alkylene of 2 to 3 carbon atoms, said compound being free of sulfo and carboxyl groups.

2. A compound having the formula

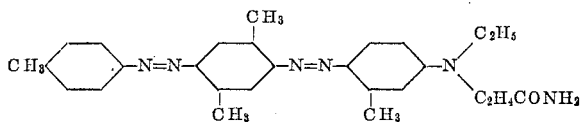

3. A compound having the formula

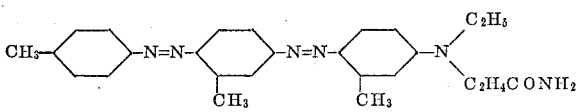

4. A compound having the formula

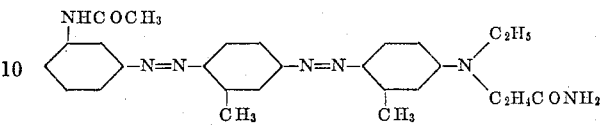

5. A compound having the formula

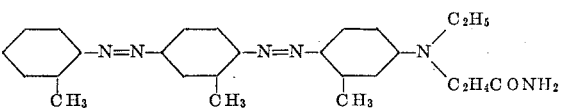

6. A compound having the formula

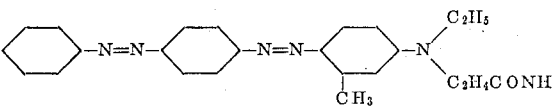

References Cited by the Examiner

UNITED STATES PATENTS

| | | | |
|---|---|---|---|
| 2,346,013 | 4/1944 | Dickey | 260—207.1 |
| 2,746,952 | 5/1956 | Dickey et al. | 260—155 |
| 3,117,959 | 1/1959 | Dehnert | 260—155 |

CHARLES B. PARKER, *Primary Examiner.*

REYNOLD J. FINNEGAN, DONALD M. PAPUGA, *Assistant Examiners.*